US012000496B2

(12) United States Patent
Choate et al.

(10) Patent No.: US 12,000,496 B2
(45) Date of Patent: Jun. 4, 2024

(54) SYSTEM AND METHOD FOR VALVE CONVERSION

(71) Applicant: VAULT PRESSURE CONTROL LLC, Houston, TX (US)

(72) Inventors: Jeremy Ryan Choate, Houston, TX (US); Keith M. Adams, Katy, TX (US); Lloyd Cheatham, Lake Jackson, TX (US)

(73) Assignee: VAULT PRESSURE CONTROL, LLC, Houston, TX (US)

( * ) Notice: Subject to any disclaimer, the term of this patent is extended or adjusted under 35 U.S.C. 154(b) by 0 days.

(21) Appl. No.: 17/003,426

(22) Filed: Aug. 26, 2020

(65) Prior Publication Data

US 2021/0062920 A1 Mar. 4, 2021

Related U.S. Application Data (60) Provisional application No. 62/892,699, filed on Aug. 28, 2019.

(51) Int. Cl.
| *F16K 3/02* | (2006.01) |
| *F16K 31/02* | (2006.01) |
| *F16K 31/16* | (2006.01) |
| *F16K 31/50* | (2006.01) |

(52) U.S. Cl.
CPC .......... *F16K 3/0272* (2013.01); *F16K 3/0254* (2013.01); *F16K 31/02* (2013.01); *F16K 31/16* (2013.01); *F16K 31/508* (2013.01)

(58) Field of Classification Search
CPC ...... F16K 3/0272; F16K 3/0254; F16K 31/02; F16K 31/16; F16K 31/508

USPC ...... 137/15.23, 291, 315.27, 315.29, 315.28, 137/315.14, 454.6, 867; 251/266, 248, 251/236, 347, 326
See application file for complete search history.

(56) References Cited

U.S. PATENT DOCUMENTS

| 1,261,949 | A | * | 4/1918 | Lucas | F16K 31/5284 |
| | | | | | 251/229 |
| 1,784,094 | A | * | 12/1930 | Fletcher | F16K 31/53 |
| | | | | | 251/229 |
| 2,745,294 | A | * | 5/1956 | Kron | F16K 31/05 |
| | | | | | 74/625 |
| 2,955,486 | A | * | 10/1960 | Bacchi | F16K 31/05 |
| | | | | | 475/2 |
| 3,063,079 | A | * | 11/1962 | Bergman | F16L 55/46 |
| | | | | | 15/104.062 |

(Continued)

Primary Examiner — Minh Q Le
(74) Attorney, Agent, or Firm — Morgan, Lewis & Bockius LLP (57) ABSTRACT

A valve assembly includes a valve body, a valve bonnet, coupled to the valve body, an opening extending through the valve body and the valve bonnet, along a longitudinal axis, and a valve stem. The valve assembly also includes a valve member positioned at an end of the valve stem and arranged within the opening, the valve member being movable, along the longitudinal axis, between an open position and a closed position, an actuator housing coupled to the bonnet, and an adapter assembly coupled to the actuator housing. The adapter assembly includes an adapter element, the adapter element coupled to the valve stem and a force converter coupled to the adapter element, the force converter translating an external rotating force into an axial force.

18 Claims, 4 Drawing Sheets

(56) References Cited

U.S. PATENT DOCUMENTS

| | | | | |
|---|---|---|---|---|
| 3,198,478 | A * | 8/1965 | Johnston | F16K 31/05 251/85 |
| 3,396,938 | A * | 8/1968 | Matsui | F16K 31/46 251/229 |
| 3,412,750 | A * | 11/1968 | Volpin | F16K 43/008 137/315.32 |
| 3,583,416 | A * | 6/1971 | Nebesnik | F16K 3/314 137/15.23 |
| 4,082,247 | A * | 4/1978 | Dalton | F16K 31/50 251/229 |
| 4,350,322 | A * | 9/1982 | Mueller | F16K 31/502 137/556 |
| 4,389,037 | A * | 6/1983 | Anders | F16K 3/12 251/326 |
| 4,405,113 | A * | 9/1983 | Erwin | F16K 3/184 137/246.22 |
| 5,240,030 | A * | 8/1993 | Wang | F16K 31/055 137/269 |
| 5,657,961 | A * | 8/1997 | Kalsi | F16K 3/12 251/324 |
| 5,820,106 | A * | 10/1998 | Wurangian | F16K 3/316 251/326 |
| 6,422,535 | B1 * | 7/2002 | Stone | F16K 3/0227 251/327 |
| 9,212,758 | B2 * | 12/2015 | Adams | F15B 15/10 |
| 9,377,121 | B2 * | 6/2016 | Burgess | F16K 31/54 |
| 9,708,886 | B2 * | 7/2017 | Frenzel | E21B 34/02 |
| 10,060,548 | B1 * | 8/2018 | Oak | F16K 3/26 |
| 10,364,645 | B2 * | 7/2019 | McKeon | E21B 34/02 |
| 11,047,505 | B2 * | 6/2021 | Choate | F16K 31/1262 |
| 2004/0216888 | A1 * | 11/2004 | Schmidt | F16K 37/0041 166/242.6 |
| 2005/0247900 | A1 * | 11/2005 | Marsh | F16K 31/047 251/129.11 |
| 2008/0217569 | A1 * | 9/2008 | Holliday | F16K 31/50 251/248 |
| 2011/0001076 | A1 * | 1/2011 | Sidler | F16K 3/0263 251/248 |
| 2011/0083747 | A1 * | 4/2011 | Orino | F16K 31/508 251/129.01 |

\* cited by examiner

SYSTEM AND METHOD FOR VALVE CONVERSION

CROSS REFERENCE TO RELATED APPLICATIONS

This application claims priority to and the benefit of U.S. Provisional Application Ser. No. 62/892,699 filed Aug. 28, 2019 titled "SYSTEM AND METHOD FOR VALVE CONVERSION," the full disclosure of which is hereby incorporated herein by reference in its entirety for all purposes.

BACKGROUND

1. Field of Invention

This disclosure relates in general to oil and gas tools, and in particular, to systems and methods for converting a valve actuation mechanism.

2. Description of the Prior Art

In oil and gas production, it may be desirable to modify an actuation mechanism utilized on a valve. For example, it may be desirable to convert a manually actuated valve into an electrically actuated valve. However, different drive components, such as yokes, between manual and automated valves may provide challenges for changing actuation mechanisms.

SUMMARY

Applicant recognized the problems noted above herein and conceived and developed embodiments of systems and methods, according to the present disclosure, for valves and valve assemblies.

In an embodiment, a valve assembly includes a valve body, a valve bonnet, coupled to the valve body, an opening extending through the valve body and the valve bonnet, along a longitudinal axis, and a valve stem. The valve assembly also includes a valve member positioned at an end of the valve stem and arranged within the opening, the valve member being movable, along the longitudinal axis, between an open position and a closed position, an actuator housing coupled to the bonnet, and an adapter assembly coupled to the actuator housing. The adapter assembly includes an adapter element, the adapter element coupled to the valve stem and a force converter coupled to the adapter element, the force converter translating an external rotating force into an axial force.

In an embodiment, an adapter assembly for converting a valve from a first operating mode to a second operating mode includes an adapter housing. The adapter assembly also includes an adapter element arranged within the adapter housing, the adapter element having a recess to receive a stem. The adapter assembly further includes a force converter arranged within the adapter housing, the force converter receiving an input force and converting the input force into an axial force applied to the adapter element. The adapter assembly also includes a sleeve positioned about the adapter element, the sleeve interfacing with the force converter to transmit the axial force to the adapter element.

In an embodiment, a method of converting an operating mode of a valve includes positioning a valve in a closed position. The method also includes removing, from the valve, a first actuator. The method further includes securing an adapter element, from a second actuator, to a stem of the valve, the adapter element being associated with an adapter assembly coupled to the second actuator. The method also includes securing, to a bonnet of the valve, the second actuator. The method further includes operating the valve using the second actuator.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward systems and methods to facilitate conversion between manual and automated valve drive mechanisms (e.g., actuators) by utilizing a simple, robust, and fast conversion system. In various embodiments, a valve may be equipped with one or more quick connect fittings to facilitate rapid connection between a valve actuator housing and a bonnet, as described in U.S. Pat. No. 9,212,758, which is hereby incorporated by reference in its entirety for all purposes. However, the rapid installation of the actuator housing may not be adapted to converting between an automated actuator (e.g., electric, pneumatic, hydraulic, etc.) and a manual actuator, such as a hand wheel or the like. Specifically, automated systems may utilize a different, and often incompatible, drive mechanism to translate force from the actuator to a valve stem, which may move between an open and closed position. Embodiments of the present disclosure incorporate an adapter assembly, which may include a yoke and adapter, into a replacement housing that may utilize a quick connect feature that enables rapid installation when associated with the bonnet.

Embodiments of the present disclosure are directed toward an efficient and easy conversion between driving mechanisms utilized with a valve. While embodiments may describe conversion between automated and manual drive mechanisms, it should be appreciated that embodiments may be used to translate between different kinds of automated drive mechanisms. For example, a pneumatic actuator may be changed with an electric or hydraulic actuator. In operation, the valve may be positioned in a desired operational condition, such as a closed position, and a first actuator may be removed, such as by rotating a first actuator housing about a bonnet. Thereafter, a second actuator housing having a second drive mechanism, which may be the same type or different type of drive mechanism, may be installed using the same bonnet, valve stem, and other components of the valve. In this manner, different drive mechanisms may be quickly switched between valves without taking the valves out of service.

In operation, a valve including a bonnet and an automated actuator may be utilized for a period of time and then operations personnel may elect to swap out the actuator with an alternative actuator that includes a different mechanism, such as a manual actuator. The illustrated conversion system may be positioned to couple to the bonnet, for example, via lugs described below. In certain embodiments, at least a portion of the conversion system may be removable to facilitate coupling of a valve stem to an adapter. For example, a cap may be removable to enable installation of the fastener. In various embodiments, the conversion system may be installed while the valve is in operation, such as in a closed position, because a down stop and/or packing may remain in position, even without the presence of the actuator. Accordingly, replacement may be made rapidly while the valve is in operation, which saves time and resources for operators.

Figure 1:
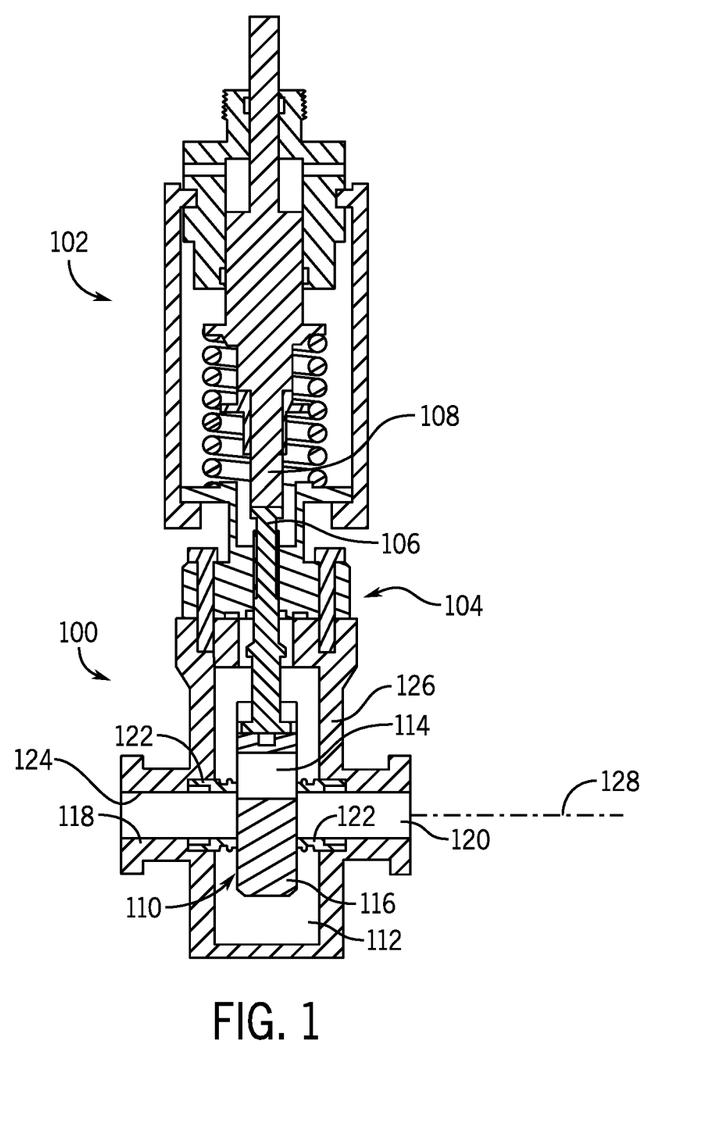
FIG. 1 is a schematic cross-sectional view of an embodiment of a valve assembly.

FIG. 1 is a cross-sectional side elevation view of an embodiment of a valve assembly 100 that includes an actuator 102 coupled to a bonnet 104. It should be appreciated that while the illustrated actuator 102 is an automated or controlled actuator, that manual operators may also be utilized within the scope of the present disclosure. The illustrated actuator 102 is coupled to a valve stem 106, via a connector 108 that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, a bore 124 extends through a valve body 126 along a valve body axis 128. The fluid is at a pressure and travels through the bore 124, for example, when the valve member 110 is positioned in an open position. It may be desirable, in various embodiments, to change the mechanism of operation that moves the valve member 110 between the open and closed position. By way of example, the illustrated actuator 102 may be a hydraulic actuator that receives a driving fluid (e.g., a gas, a liquid, etc.) to drive movement of the valve member 110. The actuator 102 may also be referred to as an automated actuator, where a control system may be used to regulate movement of the driving fluid, and as a result, may be more costly or difficult to operate than, for example, a manual actuator. However, manual actuators may use a different operational mechanism. For example, a manual actuator may include a hand wheel that drives the stem 106 to adjust a position of the valve member 110. The manual actuator may be a rising-stem valve (where the stem moves relative to the valve body) or a non-rising stem valve (where the stem does not move or only moves a small amount relative to the valve body). Additionally, an orientation of the hand wheel may also be varied for different types of manual actuators. As such, the valve stem and/or other components of the valve assembly may not be compatible between different actuator types. Embodiments of the present disclosure are directed toward a quick connection adapter that enables rapid conversion of valve actuators.

Figure 2:
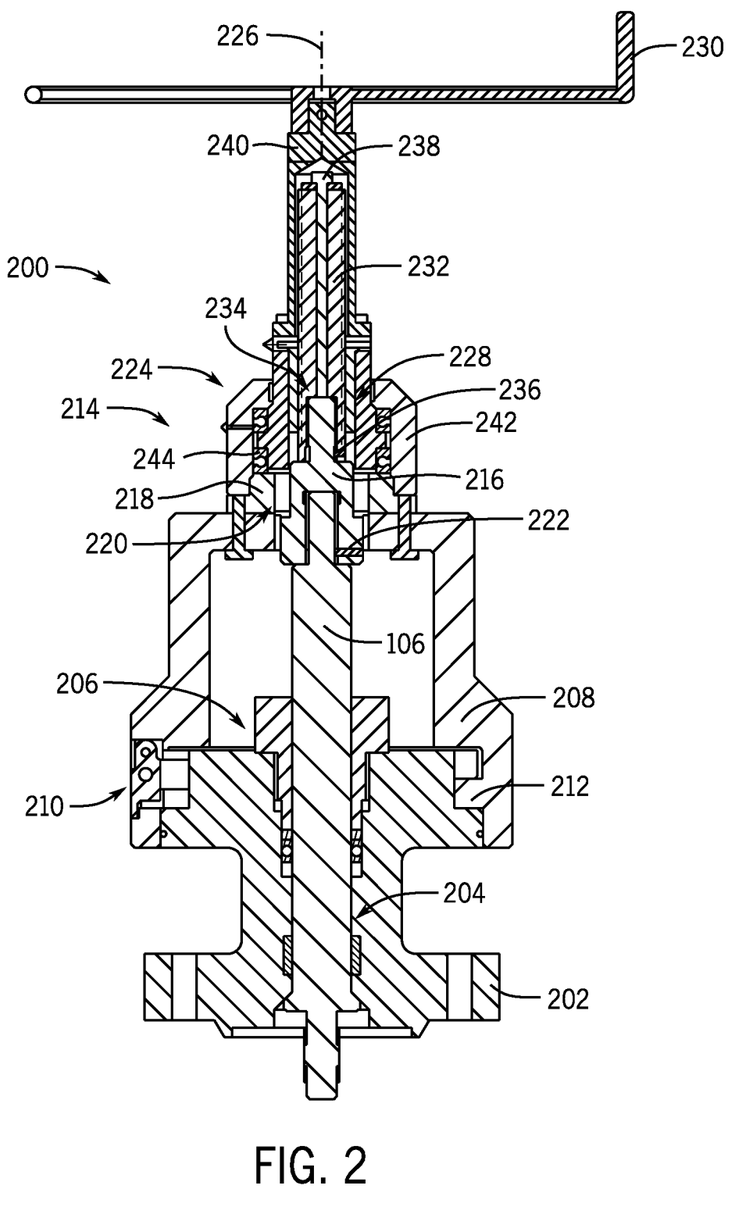
FIG. 2 is cross-sectional side view of an embodiment of a conversion system, in accordance with embodiments of the present disclosure.

FIG. 2 is a cross-sectional side view of an embodiment of a valve assembly 200, which may share one or more components with the valve assembly 100, such as the stem 106, valve member 110, and the like. As noted, it should be appreciated that like reference numerals may be used with like components, but this notation is for convenience purposes and is not intended to limit the present disclosure. As an example, different types of stems may be utilized, where various fasteners and the like may be adjusted based on operating conditions and the like. The illustrated embodiment further omits various features shown in FIG. 1, such as the valve body 126, but it should be appreciated that a bonnet 202 illustrated in FIG. 2 may replace the bonnet 104 of FIG. 1, as an example.

The illustrated bonnet 202 includes a bore 204 through which the stem 106 extends. The bore 204 includes a packing assembly 206, which blocks fluid ingress from the valve body into an actuator housing 208. As noted above, the actuator housing 208 and bonnet 202 may both include a quick connection system 210 that includes a plurality of lugs 212 that facilitate a non-threaded coupling between the actuator housing 208 and the bonnet 202. An example of the quick connection system 210 is described in U.S. Pat. No. 9,212,758, which is hereby incorporated by reference in its entirety for all purposes.

In the illustrated embodiment, an adapter assembly 214 is coupled to the actuator housing 208. In this example, the adapter assembly 214 is connected to the actuator housing 208 via fasteners, but it should be appreciated that other coupling systems may be utilized, such as threaded connections and/or the quick connection system 210. The adapter assembly 214 includes an adapter element 216 arranged on an adapter plate 218. The adapter plate 218 includes an opening 220 and the adapter element 216 extends through the opening 220 to engage the stem 106. In this configuration, at least a portion of the adapter plate 218 is arranged between the adapter element 216 and the actuator housing 208. In various embodiments, the adapter plate 218 enables an adjustment of a vertical position of the manual actuator. For example, a peak position of the manual actuator (e.g., a position when the valve is fully open) may be adjusted via different adapter plates 218. That is, multiple adapter plate 218 may be included, but for clarity and simplicity, only one is illustrated in FIG. 2. In various embodiments, the adapter plate 218 includes apertures that align with the apertures in the actuator housing to facilitate coupling via fasteners.

As shown in this configuration, the valve stem 106 is mechanically coupled to the adapter element 216, for example via a fastener or pin 222. However, it should be appreciated that in other embodiments different coupling systems may be used. For example, the adapter element 216 may include a horseshoe connector that engages the stem 106. It should be appreciated that multiple different coupling systems may be combined in order to provide a rigid coupling mechanism to secure the valve stem 106 to the adapter element 216.

The adapter assembly 214 further includes a force converter 224 coupled to the actuator element 216. As will be explained, the force converter 224 enables motive force (e.g., rotational force) applied by the manual actuator to be transferred to the stem 106. In other words, the force converter 224 converts rotational movement into axial movement, for example, along a valve axis 226. An interface 228 between the force converter 224 and the actuator element 216 enables this force transmission. For example, in various embodiments, the actuator element 216 may include splines that interface with mating splines of the force converter 224, which may be a part of a bevel gear to facilitate transmission of the circumferential motion applied by the manual actuator (e.g., a hand wheel 230) into axial movement of the valve stem 106 along the valve axis 226.

In this example, the actuator element 216 is mechanically coupled to a sleeve 232 forming at least a portion of the force converter 224. The sleeve 232 includes a recess 234 that receives the actuator element 216 and a fastener 236 secures the actuator element 216 to the sleeve 232. As noted above, this configuration is for illustrative purposes only and various embodiments of the present disclosure may include different coupling mechanisms for joining the actuator element 216 to the forcer converter 224, including the above-described splines, threaded fittings, interference fittings, and the like.

In the illustrated embodiment, the sleeve 232, and in various embodiments the valve stem 106, is further coupled to the adapter element 216 via a second fastener 238. The second fastener 238 extends through the sleeve 232 to secure the adapter element 216 to the sleeve 232. Furthermore, in embodiments, the second fastener 238 may also extend through the adapter element 216 to engage the valve stem 206. In various embodiments, the fastener 236 may also be referred to as a perpendicular fastener, a first fastener, a stem fastener, or the like. Additionally, the second fastener 238 may also be referred to as a parallel fastener, a sleeve fastener, or the like. Accordingly, in various embodiments, the adapter element 216 may include one or more rigid couplings that secure the adapter element 216 to the sleeve 232 and/or the adapter element 216. It should be appreciated that more couplings may be utilized as well as different coupling methods, as described above.

The embodiment illustrated in FIG. 2 shows the hand wheel 230 coupled to the force converter 224 to enable transmission of rotational movement of the hand wheel 230 to the force converter 224, which then translates that rotational movement into axial movement along the valve axis 226. In various embodiments, the hand wheel 230 rotates about the valve axis 226 and hand wheel coupling 240 secures the hand wheel 230 to the force converter 224, for example to the sleeve 232. Rotational movement is then converted to axial movement of the valve stem 106, which enables operators to remove expensive automated actuators and replace them with manual actuators while still maintaining functionality of the valve.

The force converter 224 utilized in FIG. 2 may be a ball screw that translates the rotational movement of the hand wheel 230 into linear movement of the valve stem 106 along the valve axis 224. For example, the adapter assembly 214 may include a housing 242 (e.g., cap) that secures and supports the various components described above. As shown, the housing 242 may be secured to the actuator housing 208 via the fasteners 214. In this example, rollers 244 are positioned within the housing 242 to facilitate conversion of the driving force provided by the hand wheel 230. For example, rotational force may be transmitted to the sleeve 232 and to the adapter element 216, thereby driving axial movement of the valve stem 106.

Figure 3:
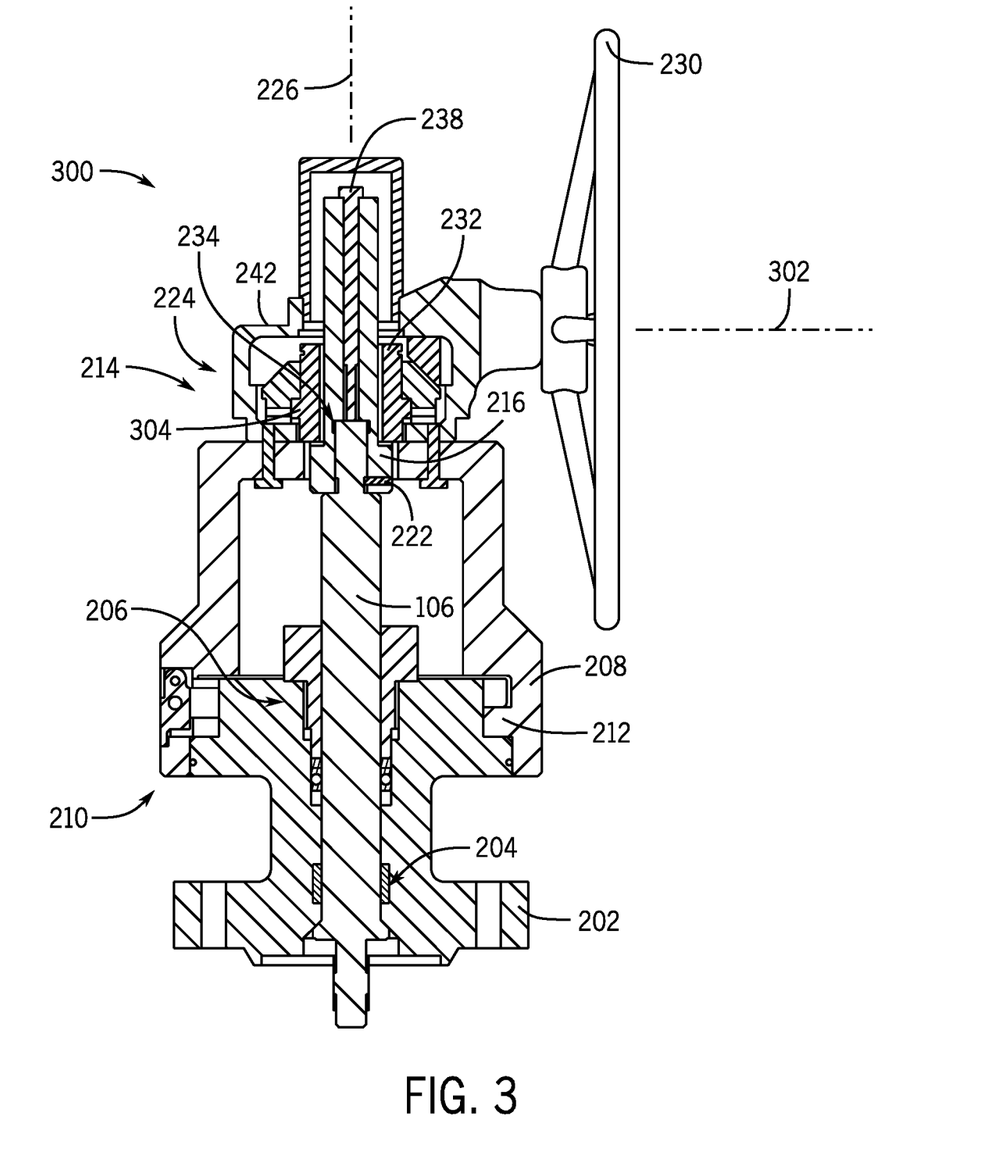
FIG. 3 is cross-sectional side view of an embodiment of a conversion system, in accordance with embodiments of the present disclosure.

FIG. 3 is a cross-sectional side view of an embodiment of a valve assembly 300, which may share one or more features with the valve assemblies 100, 200. In this example, several components have been removed for clarity, as noted with respect to FIG. 2. FIG. 3 includes the actuator housing 208 coupled to the bonnet 202 via the quick connection system 210. Further illustrated is the housing 242 secured to the actuator housing 208 using the fasteners 214.

Differing from the embodiment of FIG. 2, the valve assembly 300 of FIG. 3 includes the adapter assembly 214 without the adapter plate 218. It should be appreciated that this configuration is for illustrative purposes only, and in other embodiments the adapter plate 218 may be include in order to adjust a vertical position of the hand wheel 230 and/or a travel of the valve stem 106. Moreover, the hand wheel 230 shown in FIG. 3 is arranged such that an axis 302 of the hand wheel 230 is perpendicular to the valve axis 226.

The illustrated adapter assembly 214 includes the force converter 224 for translating the rotational movement of the hand wheel 230 into axial movement of the valve stem 106. In this configuration, the adapter element 216 is positioned within the housing 242 and engages with the force converter 224, via the sleeve 232, for example at the interface 228 that includes splines 304 that engage mating splines (not pictured) of the force converter 224. Accordingly, rotational movement of that drives the force converter 224 may be translated to the adapter element 216. For example, the rotational movement may enable axial movement of the valve member via movement between the sleeve 232 and the adapter element 216, such as a screw-fitting or other configuration. In an example, the adapter element 216 may include threads and mating threads on the sleeve 232 may facilitate movement of the valve stem 106.

The illustrated embodiment includes a dual connection between the adapter element 216 and the valve stem 106, as shown in FIG. 2. For example, the fasteners 222, 238 may be utilized to secure the adapter element 216 to the valve stem 106 at two locations, which may provide improved structural strength and reduce a likelihood of disconnection during operations. It should be appreciated that more or fewer connections may be utilized to secure the adapter element 216 to the valve stem 106.

Figure 4:
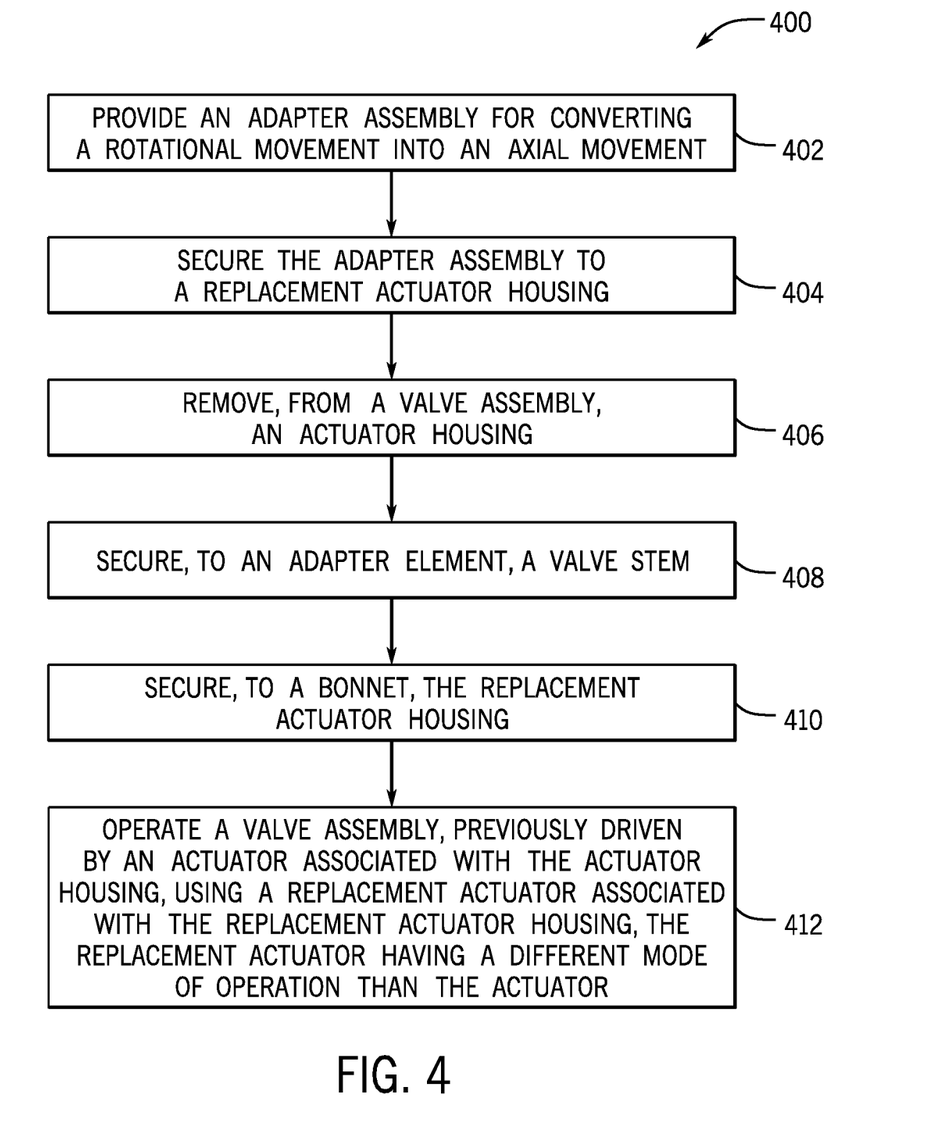
FIG. 4 is a flow chart of an embodiment of a method for changing an actuation mechanism for a valve, in accordance with embodiments of the present disclosure.

FIG. 4 is a flow chart of an embodiment of a method 400 for replacing an actuator for a valve assembly. It should be appreciated that this method, and all methods described herein, may include more or fewer steps. Moreover, the steps may be performed in a different order, or in parallel, unless otherwise specifically stated. In this example, an adapter assembly is provided 402. As noted herein, the adapter assembly may be used to change an operational mode for an actuator, such as changing from a hydraulic actuator to a hand wheel. The adapter assembly is secured to a replacement actuator housing 404. In various embodiments, the replacement actuator housing may be operational with a quick connection system, as described herein, that enables rapid removal and installation of the actuator housing. It should be appreciated that in other embodiments the actuator housing may not be operational with the quick connection system. In this manner, an actuator assembly may be formed that enables changes in valve operation.

In various embodiments, an actuator housing is removed from a valve assembly 406. In embodiments, the valve assembly may include the quick connection system such that the actuator housing may be rapidly removed. Additionally, in certain embodiments, the actuator housing may be associated with an actuator with uses a first method of operation, such as hydraulic fluid. In certain embodiments, the actuator housing and actuator may be disconnected and removed while the valve is in service, such as in a closed position. An adapter element of the replacement actuator housing is secured to a valve stem 408. For example, the adapter element may be mechanically fastened to the valve stem, such as via a fastener. However, in other embodiments, various other connections such as press fits, non-threaded fittings, lock rings, and the like may be used. As noted here, multiple connections may be used to increase the strength of the connection to reduce the likelihood of disconnection. The replacement actuator housing is secured to the bonnet 410. In embodiments where both the replacement actuator housing and the actuator housing use the quick connection system, installation of the replacement actuator housing may be rapid and performed with minimal tooling and, in various embodiments, without additional threaded fittings. The valve assembly may then resume operations using the mode of operation of the replacement actuator 412. For example, a valve assembly that previously used a hydraulic actuator may now use a manual actuator. Accordingly, operators may reduce costs by replacing expensive automated actuators after their use decreases or ceases.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
   a valve body comprising a throughbore with a central axis;
   a valve bonnet, coupled to the valve body;
   an opening extending through the valve body and the valve bonnet, along a longitudinal axis substantially orthogonal to the central axis of the throughbore of the valve body;
   a valve stem;
   a valve member positioned at an end of the valve stem and arranged within the opening, the valve member being movable, along the longitudinal axis, between an open position and a closed position;
   a first actuator housing configured to be coupled to the valve bonnet and comprising a first adapter assembly configured to be coupled directly to the valve stem;
   a second actuator housing configured to be coupled to the valve bonnet and comprising a second adapter assembly configured to be coupled directly to the valve stem and to translate an external rotating force into an axial force; and
   the valve stem configured to be selectively coupled to either the first adapter assembly or the second adapter assembly.

2. The valve assembly of claim 1, further comprising:
   an adapter plate positioned between the first actuator housing and the first adapter assembly.

3. The valve assembly of claim 1, further comprising:
   a sleeve of at least one of the adapter assemblies, the sleeve positioned around at least a portion of the adapter assembly, wherein the sleeve is rigidly coupled to the adapter assembly.

4. The valve assembly of claim 3, wherein the sleeve includes an interface configured to engage the second adapter assembly.

5. The valve assembly of claim 1, wherein the second adapter assembly comprises at least one of a bevel gear, a ball screw, a worm gear, or a slider-crank.

6. The valve assembly of claim 1, wherein the first actuator housing has a first motive driving force, the second actuator housing has a second motive driving force, and the first motive driving force is different from the second motive driving force.

7. The valve assembly of claim 1, further comprising:
   a first fastener securing the first adapter assembly to the valve stem; and
   a second fastener securing the first adapter assembly to the valve stem;
   wherein the first fastener is positioned substantially perpendicular to the valve stem and the second fastener is positioned substantially parallel to the valve stem.

8. A method of converting an operating mode of a valve, comprising:
   actuating a first actuator comprising a first actuator housing and a first adapter assembly coupled directly to a valve stem to axially move the valve stem along a longitudinal axis, thereby obstructing a valve throughbore oriented substantially orthogonal to the longitudinal axis;
   removing, from the valve, the first actuator;
   replacing the first adapter assembly with a second adapter assembly configured to be coupled directly to the valve stem and to translate an external rotating force into an axial force to the valve stem;
   securing, to a bonnet of the valve, a second actuator housing from the second actuator; and
   operating the valve using the second actuator to axially move the valve stem along the longitudinal axis, thereby obstructing the valve throughbore.

9. The method of claim 8, wherein a first operating mode for the first actuator is different from a second operating mode of the second actuator.

10. The method of claim 8, wherein the second adapter assembly is configured to convert a rotational movement into an axial movement.

11. The method of claim 8, wherein the stem is mechanically secured to the first adapter assembly.

12. The method of claim 8, wherein the second adapter assembly comprises at least one of a bevel gear, a ball screw, a worm gear, or a slider-crank.

13. The method of claim 8, further comprising the step of positioning an adapter plate between the first adapter assembly housing and the first actuator housing.

14. The method of claim 8, wherein the step of securing the second adapter assembly to the valve stem is performed using a first fastener positioned substantially perpendicular to the valve stem and a second fastener positioned substantially parallel to the valve stem.

15. The method of claim 8, further comprising the step of rigidly coupling a sleeve to at least one of the adapter assemblies.

16. The method of claim 8, wherein the step of removing the first actuator housing is performed using a quick connection system attached to the bonnet.

17. The method of claim 8, wherein the step of removing the first actuator is performed without taking the valve out of service.

18. The method of claim 9, wherein the first operating mode is at least one of a hydraulic operating mode, a pneumatic operating mode, or an electric operating mode and the second operating mode is a manual operating mode.

\* \* \* \* \*